UNITED STATES PATENT OFFICE.

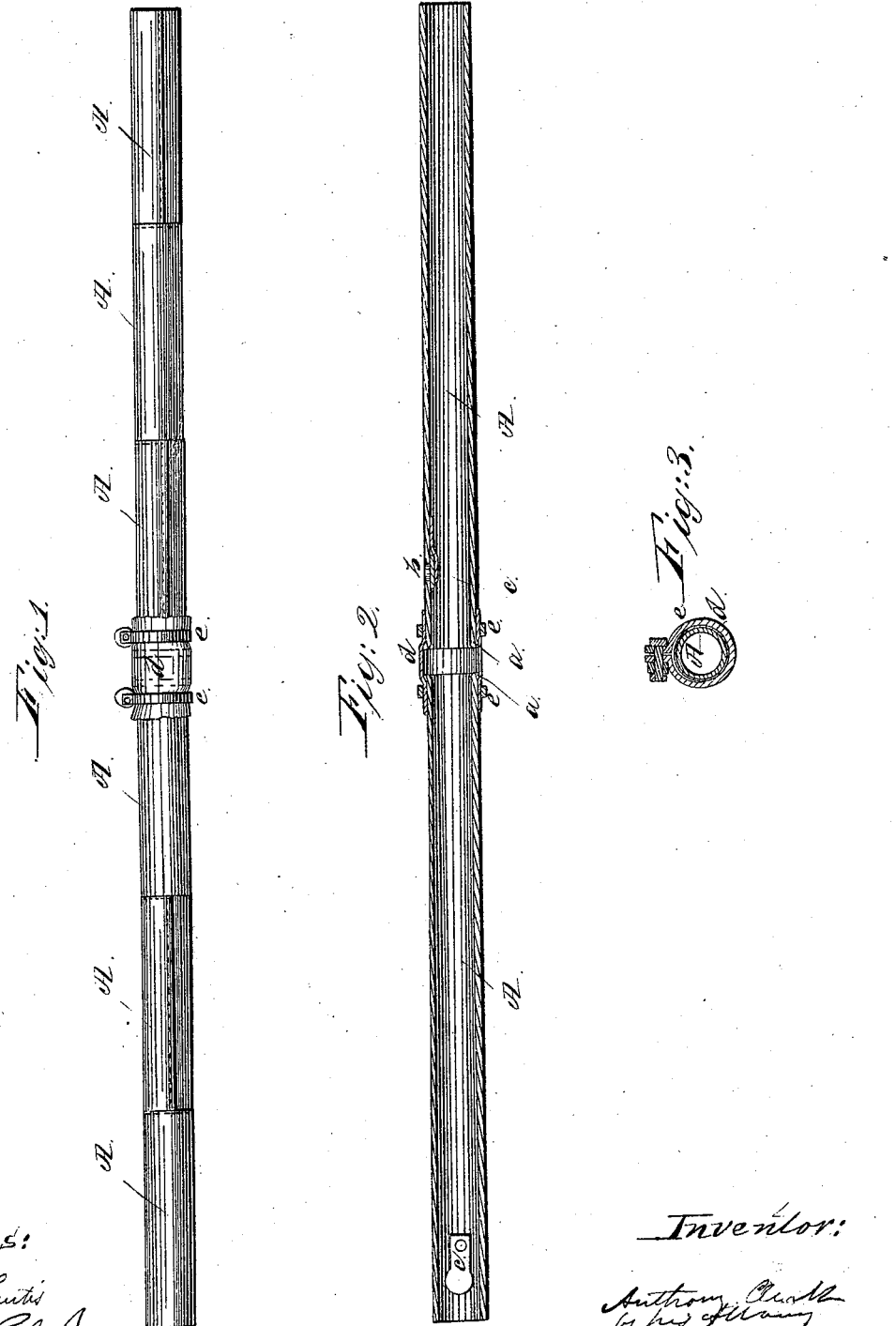

ANTHONY CLARK, OF TODD'S VALLEY, CALIFORNIA, ASSIGNOR TO HIMSELF AND GORHAM BLAKE, OF SAME PLACE.

IMPROVEMENT IN FLEXIBLE PIPE FOR MINING.

Specification forming part of Letters Patent No. 46,295, dated February 7, 1865.

*To all whom it may concern:*

Be it known that I, ANTHONY CLARK, of Todd's Valley, in the county of Placer and State of California, have invented a new and useful Improvement in Flexible Water Conduits or Pipes Used in Mining; and I do hereby declare the same to be fully described in the following specification, and represented in the accompanying drawings, of which—

Figure 1 denotes a side elevation of a conduit made in accordance with my invention. Fig. 2 is a longitudinal section of it. Fig. 3 is a transverse section of it, taken through one of the clamping-rings of one of the flexible joints of the conduit.

In constructing the said flexible conduit I make use of a series of thin metallic pipes, A A A, which may be made of ordinary sheet-iron and like a common stove-pipe. Each of these sectional pipes should have at each of its ends a flange, *a*, and besides such flange the pipe should have a hole, *b*, formed through its side, to which hole a valve, *c*, opening into the pipe, should be applied. Each of the said sectional pipes A is to be connected to that pipe which is next to it by means of a flexible joint made of a strip of water-proof or other suitable cloth or canvas, *d*, wound on itself and on the two next adjacent flanges of the two pipes, the cloth projecting beyond each flange and being encompassed by two clamp-rings, *e e*, made and provided with clamping screw-bolts and nuts, the said clamp-rings being made and arranged with respect to the pipes and cloth in manner as represented in Figs. 1, 2, and 3. The clamp-rings serve to fasten the cloth firmly to the pipes with close joints. The two adjacent ends of the pipes which are so connected by the cloth are to be placed at such a distance apart as to allow the pipes to be disposed at any desirable angle to one another.

A flexible conduit so made is of great value in what is termed "hydraulic mining," and particularly for transferring water from a reservoir to any place where it may be desirable to use it.

The lateral openings and their valves of the pipe are for the purpose not only of enabling water to be readily discharged from the pipes preparatory to any removal of the conduit, but they serve to prevent the pipes from becoming collapsed by atmospheric pressure when a sudden shutting off the water at the reservoir may happen.

The advantages of a conduit, as described, over hose made of canvas, leather, or india-rubber are very great to the miner. The friction of the water in passing through the conduit is, generally speaking, less than in a hose, and consequently the water may be ejected from the conduit with greater force.

Besides costing less in its manufacture than leather or rubber hose, my improved conduit is more durable, and can be handled and transported or moved from place to place with equal if not greater facility.

I claim as my invention—

The improved flexible conduit, made as described—viz., of metallic pipes, cloth connections, clamping-rings, valves and valve-openings—constructed and arranged together substantially as represented and explained.

ANTHONY CLARK.

Witnesses:
J. F. ALEX,
J. A. HALL.